US010190926B2

(12) United States Patent
Hao et al.

(10) Patent No.: US 10,190,926 B2
(45) Date of Patent: Jan. 29, 2019

(54) FIBER BRAGG GATING (FBG) SENSOR

(71) Applicants: AGENCY FOR SCIENCE, TECHNOLOGY AND RESEARCH, Singapore (SG); ST Electronics (Satcom & Sensor Systems) Pte Ltd, Singapore (SG)

(72) Inventors: Jianzhong Hao, Singapore (SG); Bo Dong, Singapore (SG); Verghese Paulose, Singapore (SG); Bo Lin, Singapore (SG); Peng Peng Bernard Lee, Singapore (SG); Boon Hock Tan, Singapore (SG)

(73) Assignees: AGENCY FOR SCIENCE, TECHNOLOGY AND RESEARCH, Singapore (SG); ST ELECTRONICS (SATCOM & SENSOR SYSTEMS) PTE LTD, Singapore (SG)

( * ) Notice: Subject to any disclaimer, the term of this patent is extended or adjusted under 35 U.S.C. 154(b) by 0 days.

(21) Appl. No.: 15/096,194

(22) Filed: Apr. 11, 2016

(65) Prior Publication Data
US 2016/0223414 A1 Aug. 4, 2016

Related U.S. Application Data

(63) Continuation of application No. 14/115,507, filed as application No. PCT/SG2012/000157 on May 4, 2012, now Pat. No. 9,335,482.
(Continued)

(51) Int. Cl.
*G01L 1/24* (2006.01)
*G08B 13/12* (2006.01)
(Continued)

(52) U.S. Cl.
CPC .......... *G01L 1/246* (2013.01); *G02B 6/02209* (2013.01); *G02B 6/2558* (2013.01);
(Continued)

(58) Field of Classification Search
CPC ......... G02L 1/246; G02B 6/34; G08B 13/124; Y10T 29/49826
See application file for complete search history.

(56) References Cited

U.S. PATENT DOCUMENTS 4,289,553 A 9/1981 Nolf
4,450,434 A 5/1984 Nielsen et al.
(Continued)

FOREIGN PATENT DOCUMENTS

DE 3928635 A1 4/1990
DE 3928635 C2 3/1993
WO WO-2010/034321 A1 4/2010

OTHER PUBLICATIONS

Lin et al., "Armored Fiber Bragg Grating Sensor for Wall Intrusion Detection," in Frontiers in Optics 2014, OSA Technical Digest (online) (Optical Society of America, 2014), paper FTu4B.2.*
(Continued)

*Primary Examiner* — Peter Radkowski
(74) *Attorney, Agent, or Firm* — Womble Bond Dickinson (US) LLP

(57) ABSTRACT

A Fiber Bragg grating (FBG) sensor structure, a method of fabricating a FBG sensor structure, and a method of employing a FBG sensor structure comprising an optical fiber portion having at least one FBG formed therein. The FBG sensor structure comprises an optical fiber portion having at least one FBG formed therein; and a sleeve structure capable of transferring vibrations and/or strain along a length thereof; wherein the optical fiber portion is coupled to the
(Continued)

sleeve structure such that the central wavelength of the FBG, is variable under the transferred vibrations and/or strain.

7 Claims, 11 Drawing Sheets

Related U.S. Application Data

(60) Provisional application No. 61/482,333, filed on May 4, 2011.

(51) Int. Cl.
*G02B 6/34* (2006.01)
*G02B 6/02* (2006.01)
*G02B 6/255* (2006.01)

(52) U.S. Cl.
CPC .............. *G02B 6/34* (2013.01); *G08B 13/124* (2013.01); *Y10T 29/49826* (2015.01)

(56) References Cited

U.S. PATENT DOCUMENTS

| | | | |
|---|---|---|---|
| 5,530,430 A | 6/1996 | Pavlov | |
| 5,757,487 A * | 5/1998 | Kersey | G01D 5/35383 356/478 |
| 6,256,090 B1 * | 7/2001 | Chen | G01B 11/18 250/227.14 |
| 6,275,627 B1 * | 8/2001 | Wu | G02B 6/2551 385/123 |
| 6,285,806 B1 * | 9/2001 | Kersey | G01D 5/35383 385/12 |
| 6,321,006 B2 * | 11/2001 | Wu | G02B 6/2551 385/123 |
| 6,428,217 B1 * | 8/2002 | Giltner | G02B 6/2551 372/6 |
| 6,492,636 B1 * | 12/2002 | Chen | G01B 11/16 250/227.14 |
| 6,591,025 B1 * | 7/2003 | Siems | G01H 3/005 250/227.14 |
| 6,923,048 B2 * | 8/2005 | Willsch | G01K 11/32 374/E11.015 |
| 6,937,151 B1 | 8/2005 | Tapanes | |
| 6,980,108 B1 | 12/2005 | Gebbia et al. | |
| 6,987,584 B1 | 1/2006 | Wiesenberg | |
| 7,038,190 B2 * | 5/2006 | Udd | G01D 5/35383 250/227.11 |
| 7,110,625 B2 | 9/2006 | Chun | |
| 7,123,785 B2 | 10/2006 | Iffergan | |
| 7,177,518 B2 | 2/2007 | Chun | |
| 7,295,724 B2 * | 11/2007 | Wang | A61B 5/6892 385/13 |
| 7,366,366 B2 * | 4/2008 | Takei | G01B 11/165 385/13 |
| 7,385,506 B2 * | 6/2008 | Shibata | G08B 13/124 250/227.16 |
| 7,488,929 B2 | 2/2009 | Townley-Smith et al. | |
| 7,633,052 B2 * | 12/2009 | Nakamura | G01M 11/083 250/227.14 |
| 7,702,190 B2 | 4/2010 | Hao et al. | |
| 8,436,732 B2 | 5/2013 | Lamont | |
| 9,400,221 B2 * | 7/2016 | Sarchi | G01M 5/0025 |
| 9,788,790 B2 * | 10/2017 | Black | A61B 5/0066 |
| 2001/0019103 A1 * | 9/2001 | Sugai | G01L 1/246 250/227.18 |
| 2001/0022879 A1 * | 9/2001 | Wu | G02B 6/2551 385/28 |
| 2003/0127587 A1 * | 7/2003 | Udd | G01D 5/35383 250/227.14 |
| 2004/0173004 A1 | 9/2004 | Eblen et al. | |
| 2004/0258373 A1 * | 12/2004 | Andreassen | G01D 5/35303 385/100 |
| 2005/0024210 A1 | 2/2005 | Maki | |
| 2005/0061058 A1 * | 3/2005 | Willsch | G01K 11/32 73/23.32 |
| 2005/0077455 A1 | 4/2005 | Townley-Smith et al. | |
| 2005/0244116 A1 * | 11/2005 | Evans | G01M 11/086 385/110 |
| 2005/0254787 A1 | 11/2005 | Chun | |
| 2006/0054796 A1 | 3/2006 | Chun | |
| 2006/0083458 A1 | 4/2006 | Iffergan | |
| 2006/0197665 A1 | 9/2006 | Shibata et al. | |
| 2007/0133922 A1 * | 6/2007 | Murphy | G02B 6/421 385/12 |
| 2007/0258674 A1 * | 11/2007 | Wang | A61B 5/6892 385/13 |
| 2009/0129722 A1 | 5/2009 | Hao et al. | |
| 2009/0269001 A1 * | 10/2009 | Lee | G08B 13/124 385/12 |
| 2009/0285521 A1 * | 11/2009 | Kunigami | G01B 11/18 385/13 |
| 2009/0287092 A1 | 11/2009 | Leo et al. | |
| 2010/0282935 A1 | 11/2010 | Zannoni | |
| 2010/0305452 A1 * | 12/2010 | Black | A61B 5/0066 600/476 |
| 2010/0315232 A1 | 12/2010 | Lamont | |
| 2011/0135247 A1 * | 6/2011 | Achara | E21B 47/011 385/12 |
| 2011/0226070 A1 * | 9/2011 | Berendes | G01L 1/246 73/862.55 |
| 2011/0249252 A1 | 10/2011 | Lantz et al. | |
| 2012/0082422 A1 * | 4/2012 | Sarchi | G01K 11/32 385/101 |

OTHER PUBLICATIONS

Lin et al., The utilization of fiber Bragg grating sensors to monitor high performance concrete at elevated temperature, Smart Mater. Struct. 13 (2004) 784-790.*

Emmons et al., Strain Measurement Validation of Embedded Fiber Bragg Gratings, International Journal of Optomechatronics, 4:1, 22-33, 2010.*

International Application No. PCT/SG2012/000157, International Search Report and Written Opinion dated Jun. 15, 2012, (dated Jun. 15, 2010), 8 pgs.

Garcia, Yoany Rodriguez, "Review Article: Vibration Detection Using Optical Fiber Sensors", Journal of Sensors, vol. 2010, Article ID 936487, (Jul. 5, 2010), 12 pgs.

* cited by examiner

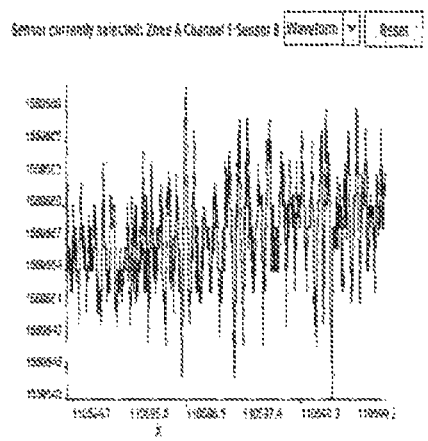
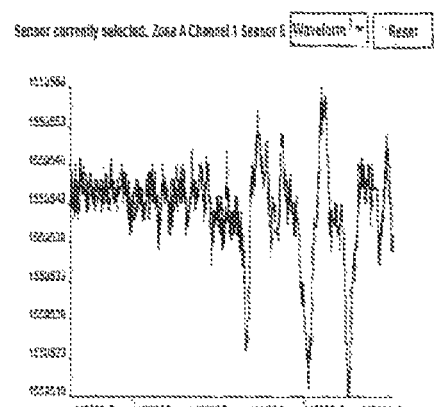
Figure 16(c)                  Figure 16(d)
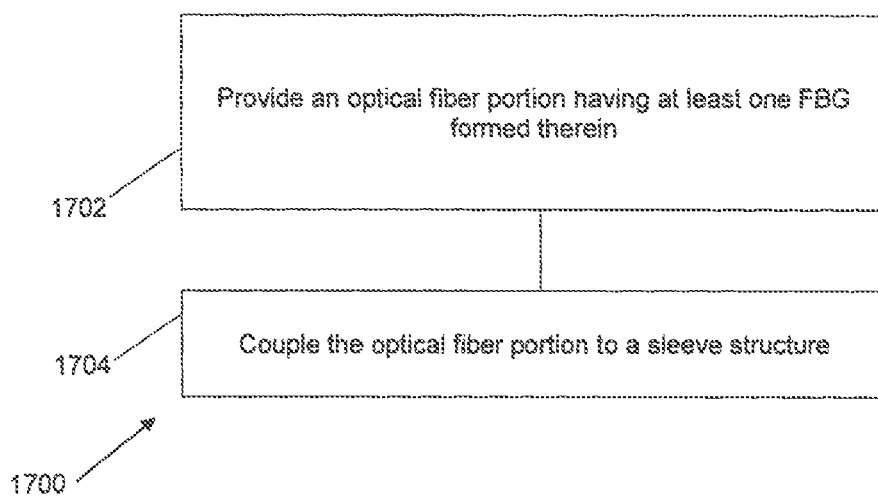
Figure 17

FIBER BRAGG GATING (FBG) SENSOR

CROSS-REFERENCE TO RELATED APPLICATIONS

This patent application is a continuation of U.S. patent application Ser. No. 14/115,507, filed Nov. 4, 2013, and having a date under 35 U.S.C. 371(c) of Jan. 15, 2014, which is a U.S. National Stage application under 35 U.S.C. § 371 of International Application No. PCT/SG2012/000157, filed May 4, 2012, and published as WO 2012/150910 A1 on Nov. 8, 2012, entitled FIBER BRAGG GRATING (FBG) SENSOR, which claims the benefit of U.S. Provisional Application No. 61/482,333, filed May 4, 2011.

FIELD OF INVENTION

The invention relates to a fiber Bragg orating (FBG) sensor structure, a method of fabricating the same, and a method of employing the same.

BACKGROUND

A fiber Bragg grating (FBG) is a type of distributed Bragg reflector constructed in a short segment of optical fiber that reflects particular wavelengths of light and transmits all others. A FBG can be used as an inline optical filter to block certain wavelengths, or as a wavelength-specific reflector. FBG sensors, which are a type of fiber optic sensors, are currently used as direct sensing elements for strain and temperature in applications such as seismology, pressure sensors for harsh environments, and sensors in oil and gas wells.

Perimeter protection and intrusion detection systems (PIDS) and methods have become an essential part of most security and surveillance systems. From applications such as border protection, airport security, equipment protection in plants, etc, PIDS have penetrated a large number of fields. The core detection technologies that are currently used in PIDS systems include microphonic sensors, microwave sensors, seismic sensors, and they have been the traditional solutions. Lately, optical fiber-based PIDS have gained popularity, being a fully passive system and not requiring power supplies or electronics in the field. In addition, there is always a demand from the market to make PIDS solutions more robust and foolproof, especially in the protection of critical infrastructure and high security areas, where it is essential that advances to PIDS systems include more accurate measurements.

A brief description of the various types of fence-mounted PIDS is given below:

Co-axial Cables: These fence or buried sensors have powerful digital signal processors to detect minute flexing in the cables along the fence.

Fiber-optic Cables: These analyze disturbances or light deflections within the fiber-optic cable caused by cutting, flexing, sawing or climbing the fence.

Microphonic Sensors: Coaxial or magnetic type sensors detect sounds associated with cutting, flexing, sawing or climbing the fence.

Taut-wire: These sensors detect changes to the tension on the fence.

Vibration: Cables are attached to one of more sensor devices which sense vibrations resulting from cutting, flexing, sawing or climbing.

However, current PIDS are susceptible to false alarms. For example, nuisance events such as rain, birds sitting on a fence or seismic vibrations caused by aircraft landing or taking off may raise false alarms.

A need therefore exists to provide a fiber Bragg grating (FBG) sensor structure, a method of fabricating the same, and a method of employing the same that seeks to address at least one of the abovementioned problems.

SUMMARY

In accordance with a first aspect of the present invention, there is provided a fiber Bragg grating (FBG) sensor structure comprising an optical fiber portion having at least one FBG formed therein; and a sleeve structure capable of transferring vibrations and/or strain along a length thereof; wherein the optical fiber portion is coupled to the sleeve structure such that the central wavelength of the FBG is variable under the transferred vibrations and/or strain.

The optical fiber portion may be coupled to the sleeve structure such that the central wavelength of the FBG may be variable under amplitude and frequency of the transferred vibrations and/or strain.

The optical fiber portion may be disposed inside the sleeve structure.

The optical fiber portion may be coupled to an inner circumference of the sleeve structure.

The ends of the optical fiber portion may be connected to the inner circumference of the sleeve structure.

One or more portions of the optical fiber portion may comprise a collar, and the one or more collars may be connected to the inner circumference of the sleeve structure.

The sleeve structure may comprise a resilient metallic tube.

The sleeve structure may further comprise a protective cover on the resilient metallic tube.

The protective cover may comprise a UV protection material.

The FBG sensor structure may further comprise a buffered fiber portion connected to at least one end of the optical fiber portion.

The buffered fiber portion may extend along the length of the sleeve structure for optical connection of the two optical fiber portion.

Two buffered fiber portions may connect at respective ends of the optical fiber portion.

The sleeve structure may be configured for suspending the optical fiber portion at a sensing location.

The optical fiber portion may comprise a single fiber having an array of FBGs formed therein.

The FBG sensor structure may comprise a plurality of optically interconnected optical fiber portions having respective FBGs formed therein, each optical fiber portion coupled to the sleeve structure such that the central wavelength of each FBG may be variable under the transferred vibrations and/or strain.

The optical fiber portion may comprise a single mode fiber.

The optical fiber portion may further comprise a loose sleeve disposed over the single mode fiber.

The FBG sensor structure may further comprise an interrogator optically connected to the one or more optical fiber portions, the interrogator configured to transmit signals to the one or more optical fiber portions and measure signals reflected from the one or more optical fiber portions.

In accordance with a second aspect of the present invention, there is provided a method of fabricating a FBG sensor structure, the method comprising the steps of providing an optical fiber portion having at least one FBG formed therein;

and coupling the optical fiber portion to a sleeve structure capable of transferring vibrations and/or strain along a length thereof, such that the central wavelength of the FBG is variable under the transferred vibrations and/or strain.

The method may further comprise the step of coupling the optical fiber portion to an inner circumference of the sleeve structure.

The method may further comprise the step of connecting the ends of the optical fiber portion to the inner circumference of the sleeve structure.

The method may further comprise the steps of attaching one or more portions of the optical fiber portion with a collar; and connecting the one or more collars to the inner circumference of the sleeve structure.

One optical fiber portion and one sleeve structure may form one sensing element.

The method may further comprise the step of connecting a plurality of sensing elements to form a sensor array.

The optical fiber portion may have an array of FBGs formed therein.

The method may comprise fabricating a plurality of optically interconnected optical fiber portions and feeding said plurality of interconnected optical fiber portions into a single sleeve structure to form a sensor array.

In accordance with a third aspect of the present invention, there is provided a method of employing a FBG sensor structure comprising an optical fiber portion having at least one FBG formed therein; the method comprising detecting wavelength variations of the optical fiber portion under vibrations and/or strain transferred using a sleeve structure coupled to the optical fiber portion.

The method may further comprise the step of suspending the FBG sensor structure between two substantially fixed mounting elements, such that the sleeve structure extends along a structural feature disposed between the mounting elements.

Disturbances experienced by the structural feature may be detected by the sleeve structure as vibrations and/or strain and transferred to the optical fiber portion, resulting in a variation of the central wavelength of the FBG.

The FBG sensor structure may be suspended in a pre-tensioned fashion.

The structural feature may comprise a fence, and the mounting elements may comprise of the fence near the struts of the fence.

The FBG sensor structure may be fixed by way of metal plates connected to the mounting elements.

The FBG structure may be supported in regions between the mounting elements in a manner such as to allow transfer of the vibrations and/or strain using the sleeve structure coupled to the optical fiber portion.

The FBG structure may be supported in the regions using a first securing means to hold the sleeve structure, and a second securing means coupled to the first securing means, the second securing means secured to the structural feature.

BRIEF DESCRIPTION OF THE DRAWINGS

Example embodiments of the invention will be better understood and readily apparent to one of ordinary skill in the art from the following written description, by way, of example only, and in conjunction with the drawings, in which:

FIGS. 16(a)-(d) show the waveforms obtained using embodiments of the present invention during various intrusion events;

FIG. 17 is a flow chart illustrating a method of fabricating a FBG sensor structure, according an example embodiment of the present invention;

DETAILED DESCRIPTION

Embodiments of the present invention relate to cable-based FBG sensors, methods of packaging the FBG sensors, and methods of mounting the FBG sensors onto a perimeter fence for intrusion detection. The cable-based FBG sensors can be disposed within a resilient metallic cable, wherein the resilient metallic cable transfers vibrations (both amplitude and frequency) and/or strain, experienced by any part of the sensor cable, to the FBG. The change in wavelength experienced by the FBG, corresponding to these vibrations and/or strain, facilitates the detection of intrusion. The resilient metallic cable preferably comprises of a UV protection sleeve and a resilient helical metal tube to provide improved sensitivity and robustness to the sensor cable (e.g. crush resistance, and protection against rodents etc).

Figure 1:
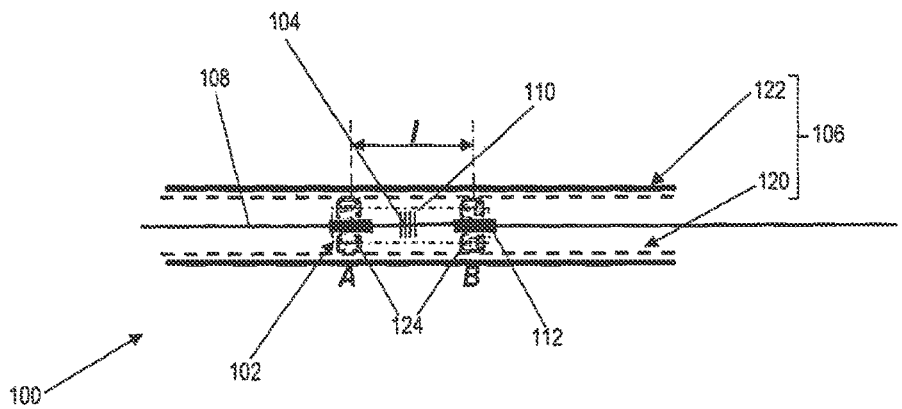
FIG. 1 is a schematic of a cable-based FBG sensor, according to an embodiment of the present invention.

FIG. 1 is a schematic of a cable-based FBG sensor, designated generally as reference numeral 100, according to an embodiment of the present invention. The cable-based FBG sensor 100 may include an optical fiber portion (within dashed box 102) having a FBG 104 formed therein, and a sleeve structure 106 capable of transferring vibrations and/or strain along a length thereof. The optical fiber portion 102 may be coupled to the sleeve structure 106 such that the wavelength of the optical fiber portion 102 is variable under the transferred vibrations and/or strain. The change in wavelength is detected by an FBG interrogator and may be processed by appropriate signal processing software. Based on the unique waveform obtained for each intrusion event, embodiments of the present invention can facilitate the detection of an intrusion event. The sleeve structure 106 may be configured to suspend the optical fiber portion 102 at a sensing location.

The FBG 104 is connected to a standard single mode fiber (SMF) 108 at both ends. It will be appreciated by a person skilled in the art that any other type of single mode fiber may be used in place of a standard SMF. A fiber of effective length l may include the FBG 104 (preferably in the middle of the length l), may be protected by a 900 μm loose tube 110 and spliced to the 900 μm tight buffer single mode fiber 108 at both ends (see reference signs A and B). The coupling (splicing) points at A and B can be protected using. e.g. fiber splice protection sleeves 112. In an example embodiment, the effective length l is 50 cm. The shorter the effective length, the higher is the sensitivity of the sensor element and vice versa. However, there has to be a compromise—it is more difficult to handle a shorter sensor because fabricating the sensor element becomes more difficult as the length becomes shorter. Furthermore, the shorter the length, the more difficult it is to set the necessary pretension during deployment.

The sleeve structure/resilient metallic cable 106 may include a resilient helical metallic tube 120 that is co-axially surrounded by a UV protection sleeve 122 substantially along the length of the resilient metallic tube 120. Each fiber splice protection sleeve 112 is mechanically coupled to the inner side of the resilient helical metal tube 120 with an epoxy 124.

Figure 2:
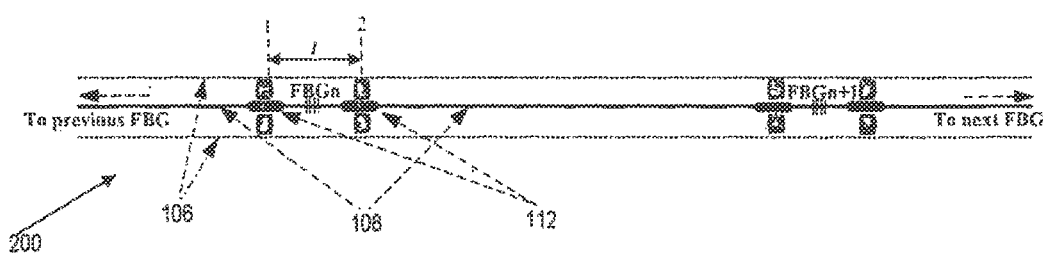
FIG. 2 is a schematic of a cable-based FBG sensor array, according to an embodiment of the present invention.

The single cable-based FBG sensor 100 shown in FIG. 1 can be regarded as a single sensing element comprising one optical fiber portion and one sleeve structure. The single sensing element can be cascaded to form a FBG sensor array 200, as shown in FIG. 2. The distance between two adjacent FBGs, which determines the spatial resolution of the FBG sensor array 200, can be varied. The cable-based FBG sensor array 200 may include a plurality of optically interconnected optical fiber portions having respective FBGs formed therein, each optical fiber portion coupled to the sleeve structure such that an wavelength of said each optical fiber portion is variable under transferred vibrations and/or strain via the sleeve structure. Alternatively, the cable-based FBG sensor array 200 may include a single optical fiber portion having an array of FBGs formed therein.

Figure 3:
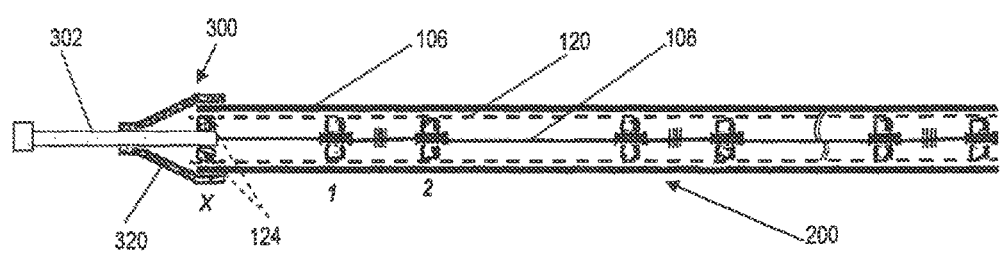
FIG. 3 is a schematic of an end-portion of a cable-based FBG sensor array, according to an embodiment of the present invention.

FIG. 3 is a schematic of one end 300 of the FBG sensor array 200, according to an embodiment of the present invention. At the one end 300 of the FBG sensor array 200, the tight buffer fiber 108 is inserted into a PVC jacket 302 (approximately 3 mm) until it reaches the start of the sleeve structure/resilient metallic cable 106 at point X. The PVC jacket 302 may contain a high strength material such as Kevlar. Subsequently, some epoxy 124 is applied to fix the 3 mm PVC jacket 302 and the inner part of the resilient helical metal tube 120 at point X. Thereafter, a connector boot 320 can be used to firmly join the resilient metallic cable 106 and the 3 mm PVC jacket 302. This is to advantageously prevent stretching of the tight buffer fiber 108 that is spliced to the first FBG sensor in the FBG sensor array 200.

A preferred non-limiting working principle according to an embodiment will now be described below.

When a strain ε is applied to an FBG and ambient temperature variation ΔT occurs, the Bragg wavelength shift of the FBG can be expressed as $$\frac{\Delta \lambda_B}{\lambda_B} = \left(1 + \frac{1}{n}\frac{\partial n}{\partial \varepsilon}\right)\varepsilon + \left(\frac{1}{l'}\frac{\partial l'}{\partial T} + \frac{1}{n}\frac{\partial n}{\partial T}\right)\Delta T, \quad (1)$$

where n is the effective index of the fiber core, l is the length of the FBG, $$P_c = -\frac{1}{n}\frac{\partial n}{\partial \varepsilon}$$

is the effective elastic-optical coefficient of the FBG, describing the strain-induced change in effective index of the fiber core;

$$\alpha = \frac{1}{l'}\frac{\partial l'}{\partial T}$$

is its thermal-expansion coefficient, describing the temperature-induced change in its length, and $$\beta = \frac{1}{n}\frac{\partial n}{\partial T}$$

is its thermal-optic coefficient, describing the temperature-induced change in effective index of the fiber core.

The L long resilient armored cable serves like a cascaded spring structure, which can be regarded as a three cascaded springs, as shown in FIG. 1. The spring 1 from the left metal plate to the coupling point 1, spring 2 from the coupling point 1 to 2, and spring 3 from the coupling point 2 to the right metal plate. Let us assume that their effective coefficients of elasticity are $k_1$, $k_2$ and $k_3$, respectively. Since the spring 1 and 3 have an almost symmetrical structure, $k_1 \approx k_3$. According to the Hooke's law, the effective coefficient of elasticity k of the L long cable can be given by $$\frac{1}{k} = \frac{1}{k_1} + \frac{1}{k_2} + \frac{1}{k_3}, \quad (2)$$

During the period from that an intrusion force is applied on the fence to that the force is withdrawn, the FBG experiences a series of dynamic vibration signal with different resonant frequencies. Assuming the dynamic vibration has a sine-wave pattern, the induced dynamic force change ΔF can be expressed as $$\Delta F = -k \sum_{i=1}^{i=n} \delta_i x_i \sin(\omega_i t), \quad (3)$$

where $x_i$ is the induced elongation of the L long cable at the i-th resonant frequency $\omega_i$, $\delta_i$ is a constant, describing the attenuation on the elongation $x_i$ at the i-th resonant frequency, which is determined by the materials and structures of the fence, packaged FBG, and sensor installation.

Based on the theory of material mechanics, and Equations (1) (2) and (3), the dynamic Bragg wavelength shift $\Delta\lambda_B$ of the FBG induced by the dynamic vibration can be given by $$\frac{\Delta\lambda_B}{\lambda_B} = \frac{-(1-P_c)}{L} \sum_{i=1}^{i=n} \delta_i x_i \sin(\omega_i t). \quad (4)$$

From Equation (4), it can be seen that, for the L long PID sensor, the response of the sensor is related with not only the peak to peak (P-P) wavelength shift but also the resonant frequency. Hence, it is possible to determine different intrusion types by analyzing the sensing signals in P-P wavelength shift and frequency response. According to Equation (3), it can be seen that the sensor with smaller k helps to enlarge the value of $$\sum_{i=1}^{i=n} \delta_i x_o \sin(\omega_i t).$$

This will help to improve the sensitivity of the sensor. According to Equation (2), it can be seen that the cascaded spring structure helps to enhance the sensitivity of the sensor.

According to Equation (1), when the temperature changes, the Bragg wavelength of the FBG will also experience corresponding wavelength shift. However, the ambient temperature change is a slow venation value while the vibration induced by the intruder is much faster. Hence, the vibration frequency of the temperature is much less than that of the intrusion signals. The low frequency temperature variation signal can be easily filtered out after Fourier transforming the time domain signal in Equation (4) to frequency domain. The slow temperature change can be regarded as a direct-current (DC) signal, and has no effect on the alternating current (AC) signal of the vibration signal induced by the intruder. Hence, the PID sensor according to embodiments of the present invention is temperature independent.

In accordance with embodiments of the present invention, three methods of packaging an FBG or FBG array into a sleeve structure (e.g. the hollow resilient helical metallic cable 106) for use, for example, in perimeter fence intrusion detection, will now be described.

The first method involves "stitching", and in this example embodiment, the distance between adjacent FBGs is assumed to be 7.2 m.

Figure 4A:
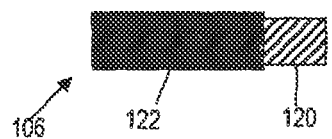
FIG. 4(a) is a schematic of a hollow resilient helical metallic cable for use in a cable-based FBG sensor, according to an embodiment of the present invention.
Figure 4B:
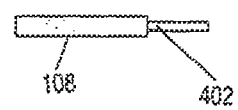
FIG. 4(b) is a schematic of a 900 μm tight buffer SMF (single mode fiber) for use in a cable-based FBG sensor, according to an embodiment of the present invention.
Figure 4C:
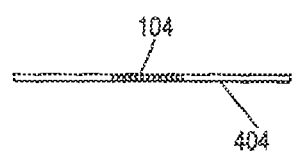
FIG. 4(c) is a schematic of a FBG for use in a cable-based FBG sensor, according to an embodiment of the present invention.

The materials/tools used in this method include:
a) a hollow resilient helical metallic cable 106, and may include a UV protection PVC jacket 122 that co-axially surrounds a resilient helical metallic tube 120, as shown in FIG. 4(a).
b) a 900 μm tight buffer SMF (single mode fiber) 108, with a 250 μm buffer 402, as shown in FIG. 4(b).
c) a fiber containing an FBG 104, with a 250 μm buffer 404, as shown in FIG. 4(c).
In this example embodiment, the specifications of the FBG are as follows:
Bandwidth 0.2~0.3 nm
Reflection>90%
FBG length: 5~10 mm
Side Lobe Suppression Ratio (SLSR)>15 dB
Stripping: Standard
Recasting: Acrylate or Polyimide
Fiber length: 0.56 m (FBG in the center)
Annealing temperature: Normal (the FBG position is preferably marked after recoating)
d) Optical fiber fusion splicer, fiber cleaver, fiber stripper, 900 μm hollow tube, splice protection sleeves, cable cutter, pliers, scissors, epoxy/super glue, heat-shrink tubes.

Figure 5A:
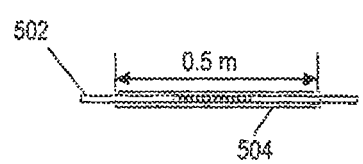
FIG. 5(a)-(f) are schematics illustrating the different stages of a method of packaging an FBG or FBG array into a sleeve structure, according to an embodiment of the present invention.
Figure 5B:
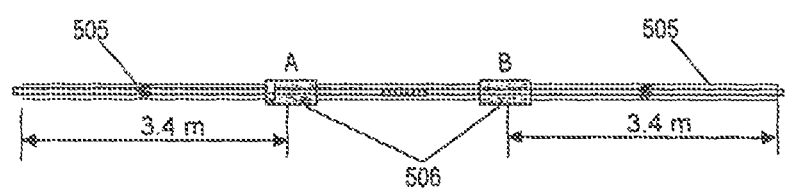
Figure 5C:
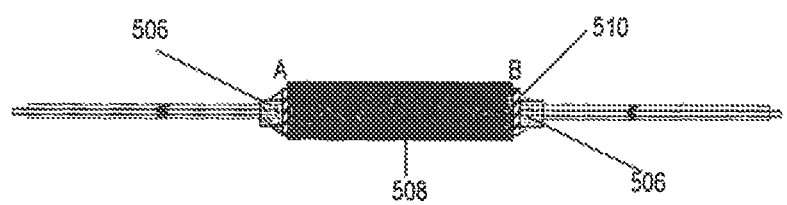
Figure 5D:
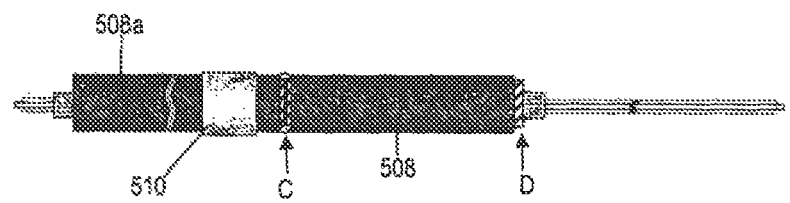
Figure 5E:
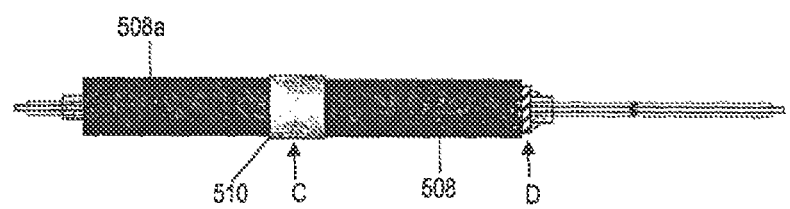
Figure 5F:
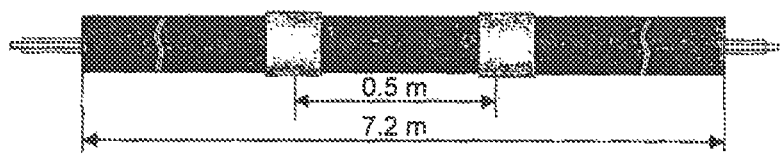

The first method using the materials discussed above may include the following steps:
a) Insert an approximately 0.56 m long fiber having an FBG 502 into a length of 900 μm loose tube 504 (about 0.5 m long) leaving about 3 cm of fiber at both the ends for cleaving and splicing (see FIG. 5(a))
b) Splice two lengths of 900 μm tight buffer SMF 505 (3.4 m long each) to both ends of the fiber from step (a) and protect the spliced points (A, B) with splice protection sleeves 506 (see FIG. 5(b)).
c) Insert a 0.5 m long hollow resilient helical metallic cable 508 from one side, such that both ends of the resilient helical metallic cable 508 cover about half of each splice protection sleeve 506. Thereafter, inject a small amount of epoxy 510 into the hollow resilient helical metallic cable 508, at points A and B, to seal up the empty space between the metallic cable 508 and the splice protection sleeve 506 (see FIG. 5(c)).
d) Insert an approximately 3.35 m long hollow resilient helical metallic cable 508a from the left side of the 4 m long 900 μm tight buffer SMF until the metallic cable 508a reaches the other half of the splice protection sleeve (which is mostly hidden in FIG. 5(d)) at point C. Thereafter, inject a small amount of epoxy into the metallic cable to seal up the empty space between the metallic cable 508a and the splice protection sleeve at point C. Thereafter, push the metallic cable 508a until the metallic cable 508a is in full contact with the existing metallic cable 508 (see FIG. 5(d)).
e) Use a heat-shrink tube 510 to cover the area around point C and apply heat such that the heat-shrink tube 510 firmly wraps around the area (see FIG. 5(e)).
f) Repeat steps (d) and (e) for the right side of the fiber for point D. FIG. 5(f) is a schematic of a single complete cable-based FBG sensor for perimeter fence intrusion detection. The sensor can be used for replacement of any broken sensor along the FBG sensor array.

Figure 6:
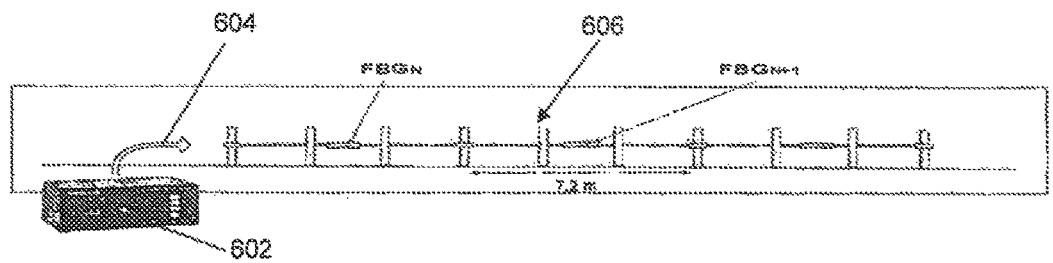
FIG. 6 is a schematic layout of a distributed FBG sensor array for a fence panel, according to an embodiment of the present invention.

FIG. 6 is a schematic layout of a distributed FBG sensor array for a fence panel, according to an embodiment of the present invention. With reference to FIG. 6, a fiber pigtail 604 may be spliced to one end of the FBG sensor or FBG sensor array 606, and connected to a multi-channel FBG interrogator 602 and signal processing unit (e.g. a PC with the necessary software) (not shown) to form a complete sensor system. The FBG interrogator 602 transmits signals and measures the reflected signals. Further details are provided with reference to FIG. 11(*a*) below.

In an alternate embodiment, a sensor may be a continuation of a first sensor by splicing a fiber from point D of one sensor directly to point C of the next sensor (refer to FIG. 5(*e*)). In any case, it will be appreciated by a person skilled in the art that in numerous instances, the sensors may have to be customized according to the various widths of the fence panels used.

The second method involves "guiding and pulling", and again in this example embodiment the distance between adjacent FBGs is assumed to be 7.2 m.

Figure 7:
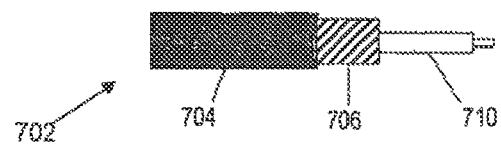
FIG. 7 is a schematic of a hollow resilient helical metallic cable for use in a cable-based FBG sensor, according to an embodiment of the present invention.
Figure 8A:
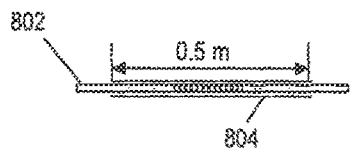
FIGS. 8(a)-(e) are schematics illustrating the different stages of a method of packaging an FBG or FBG array into a sleeve structure, according to another embodiment of the present invention.
Figure 8B:
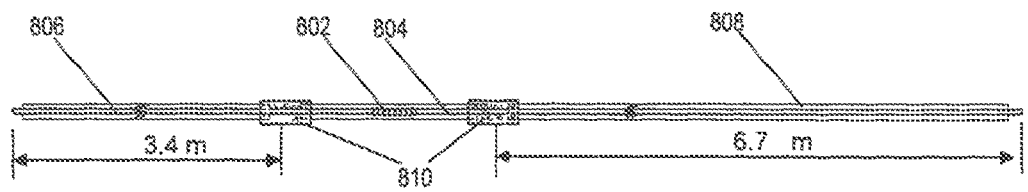
Figure 8C:
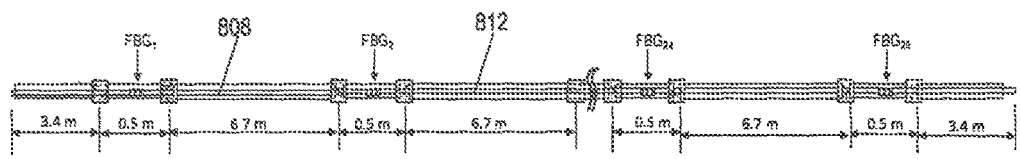
Figure 8D:
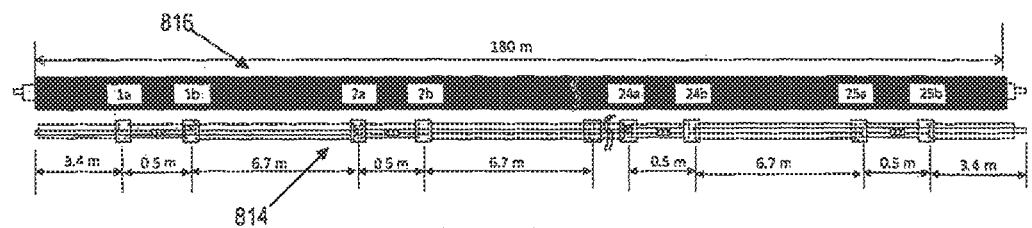
Figure 8E:
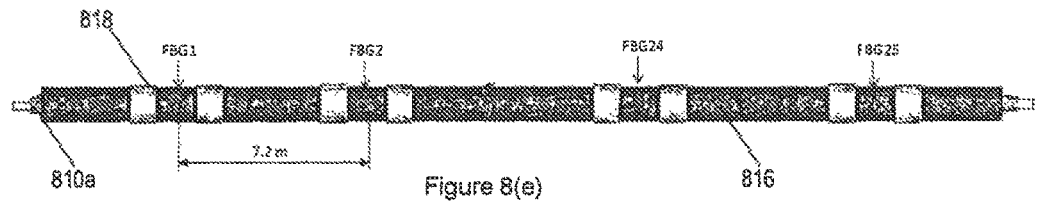

The materials/tools used in this method may include:
a) a hollow resilient helical metallic cable 702, and may include a UV protection PVC jacket 704 that co-axially surrounds a resilient helical metallic tube 706; and a guiding wire 710 (for example, a 900 μm tight buffer fiber), as shown in FIG. 7.
b) a 900 μm tight buffer SMF (single mode fiber) 108, with a 250 μm buffer 402, similar to FIG. 4(*b*) above.
c) twenty-five FBGs, each with different wavelengths, similar in structure to FIG. 4(*c*) above. More or fewer may be used.

In this example embodiment, the specifications of the FBGs are as follows:
Center wavelengths (CW) (nm): 1512, 1515, 1518, 1521, 1524, 1527, 1530, 1533, 1536, 1539, 1542, 1545, 1548, 1551, 1554, 1557, 1560, 1563, 1566, 1569, 1572, 1575, 1578, 1581, 1584
CW tolerance: 0.2 nm
Bandwidth=0.2~0.3 nm
Reflection>90%
FBG length: 5~10 mm
Side Lobe Suppression Ratio (SLSR)>15 dB
Stripping: Standard
Recoating Acrylate or Polyimide
Fiber length: 0.56 m (FBG in the center)
Annealing temperature; Normal (the FBG position is preferably marked after recoating)
d) optical fiber fusion splicer, fiber cleaver, fiber stripper, 900 μm hollow tube, splice protection sleeves, cable cutter, pliers, scissors, epoxy/super glue, heat-shrink tubes.

The second method using the materials discussed above may include the following steps:
a) Insert a 0.56 m long fiber containing $FBG_1$ 802 (CW=1512 nm) into a length of 900 μm loose tube 804 (about 0.5 m long) leaving about 3 cm of fiber at both the ends for cleaving and spacing (see FIG. 8(*a*)).
b) Splice a 3.4-meter long 900 μm tight buffer SMF 806 to one end of the fiber (from step (a) above) and another 6.7-meter long 900 μm tight buffer SMF 808 to the other end of the fiber. Thereafter, the spliced points can be protected with splice protection sleeves 810. See FIG. 8(*b*).
c) Repeat step (a) but with $FBG_2$ (CW=1515 nm). Thereafter, splice one end of $FBG_2$ to the right end of $FBG_1$; and the other end of $FBG_2$ to a 6.7-meter long 900 μm tight buffer SMF 812.
d) Repeat the preceding steps with other FBGs (having various center wavelengths) to form an array of twenty-five FBGs 814 (see FIG. 8(*c*)). The distance between any two adjacent FBGs (center to center) is about 7.2 m.
e) Place the array of twenty-five FBGs 814 adjacent to an approximately 180-meter long resilient helical metallic cable 816. Thereafter, mark the position of each fiber protective sleeve on the resilient helical metallic cable 816 (e.g. 1*a* and 1*b* for the two splice protection sleeves corresponding to $FBG_1$; 2*a* and 2*b* for the two splice protection sleeves corresponding to $FBG_2$; . . . etc (see FIG. 8(*d*)).
f) Splice the array of twenty-five FBGs 814 to one of the end-points of the 180-meter guiding wire in the resilient helical metallic cable 816. Make a marking on this splice protection sleeve (e.g. "A").
g) Pull the guiding wire from the other end of the 180-meter long resilient helical metallic cable 816. The array of twenty-five FBGs 814 enters the resilient metallic cable 816 and is guided along until the marking "A" comes out at the pulling end of the resilient helical metallic cable 816. Temporarily fix protection sleeve "A" with the resilient helical metallic cable 816.
h) The array of twenty-five FBGs 814 is now completely inside the resilient helical metallic cable 816 with each fiber splice protection sleeve 810 in place. These splice protection sleeves 810 match the markings that had been made earlier on the resilient helical metallic cable 816.
i) Remove a small portion (e.g. 1~2 cm) of the UV protection PVC jacket 704 at position 1*a*. Pull open up the resilient helical metallic tube 706 and inject some epoxy to fix the spice protection sleeve 810 to the inner wall of the resilient helical metallic tube 816. Apply the same procedure to the other marked points in order to fix the rest of the spice protection sleeves 810 to the inner wall of the resilient helical metallic tube 816.
j) Insert small sections of heat-shrink tubes 818 onto the resilient helical metallic cable 816 to cover the exposed area on the cable that was used for epoxy injection. Thereafter, apply heat on the heat-shrink tubes 818 so that the heat-shrink tubes firmly wrap around the area.
k) Insert a splice protection sleeve 810a at one end of the resilient helical metallic cable 816. Apply heat such that the splice protection sleeve 810a firmly engages the 900 μm tight buffer SMF. Thereafter, inject some resin to fix the splice protection sleeve 810a to the resilient helical metallic cable 816. Repeat the same for the other end. A resilient-helical-metallic-cable based FBG sensor array is now complete (see FIG. 8(*e*)).
l) A fiber pigtail may be spliced to one end of this sensor array and connected to an FBG interrogator and a signal processing unit (e.g. PC with the necessary software) to form a complete sensor system.

Figure 9:
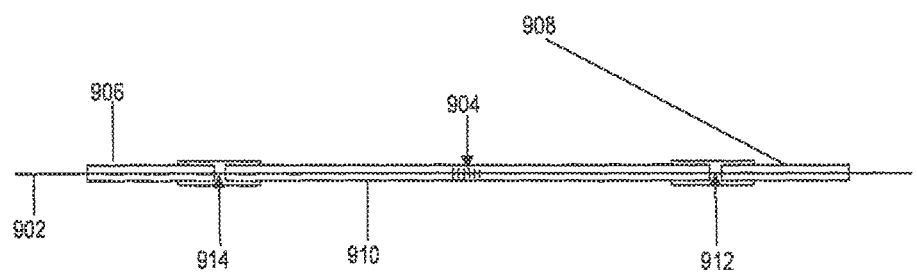
FIG. 9 is a schematic of a cable-based FBG sensor, according to another embodiment of the present invention.

With reference to FIG. 9, a third method may include the following steps:
a) a bare fiber 902, of effective length l, containing an FBG 904 (preferably in the middle of the length l), is protected by a 900 μm loose tube. The 900 μm loose tube itself is in 3 parts—two of about 25 cm each in length 906, 908, and one of approximately 50 cm in length 910, with the 50 cm piece 910 in between the two 25 cm pieces 906, 908. The fiber 902, containing the FBG 904, is pushed into the first 25 cm long loose tube e.g. 908. Thereafter, the 50 cm long loose tube 910 is pushed in.
b) A collar, here in the form of a dummy splice protection sleeve (SPS) 912 is then pushed in over the two loose tubes 908, 910. The SPS 912, containing part of the 25 cm long loose tube 908, the fiber 902 and part of the 50 cm long loose tube 910, is then kept in the heater of the Fusion Spacing Machine. The two loose tubes 908, 910 are kept about 2 cm apart. Then, the heater is turned on so as to shrink the SPS 912.

c) The second 25 cm loose tube 906 is pushed in from the other side of the 50 cm loose tube 910 along with another SPS 914 and this set, containing part of the 25 cm long loose tube 906, the fiber 902 and part of the 50 cm long loose tube 910, is also kept in the heater to be heat shrunk.

Figure 10:
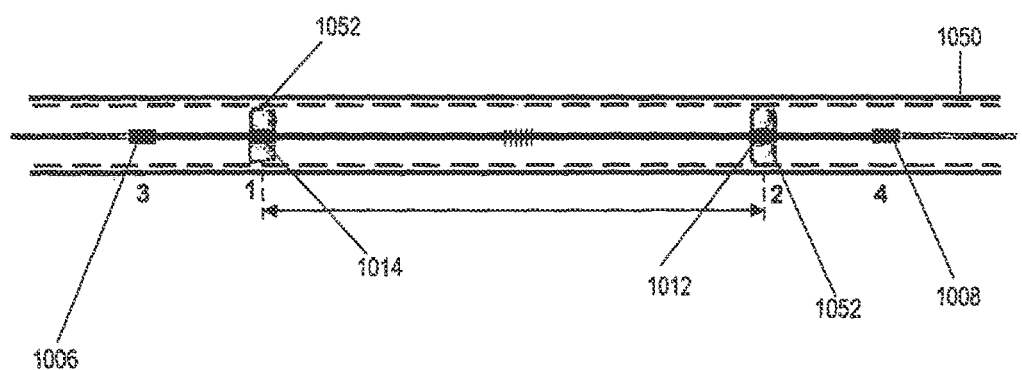
FIG. 10 is a schematic of a cable-based FBG sensor, according to another embodiment of the present invention.

In the third method, the extra pair of "dummy" fiber protection sleeves 912, 914 is used as the epoxy anchor points. The two splicing points may now be formed away from the epoxy anchor points and "freely hang" inside the cable, advantageously preventing and substantially reducing the strain on the splicing points and the likelihood of breakage at the splicing points. With reference to FIG. 10, spacing points 3 and 4 are protected using fiber splice protection sleeves 1006, 1008, and "freely hang" inside the cable. The dummy splice protection sleeves 1012, 1014 may be fixed to the inner side of the resilient helical metal tube 1050 with, e.g. epoxy 1052.

Figure 11A:
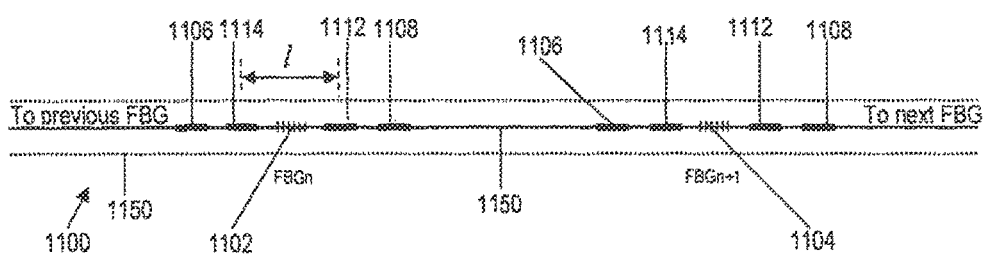
FIG. 11(a) is a schematic of a cable-based FBG sensor array, according to another embodiment of the present invention.
Figure 11B:
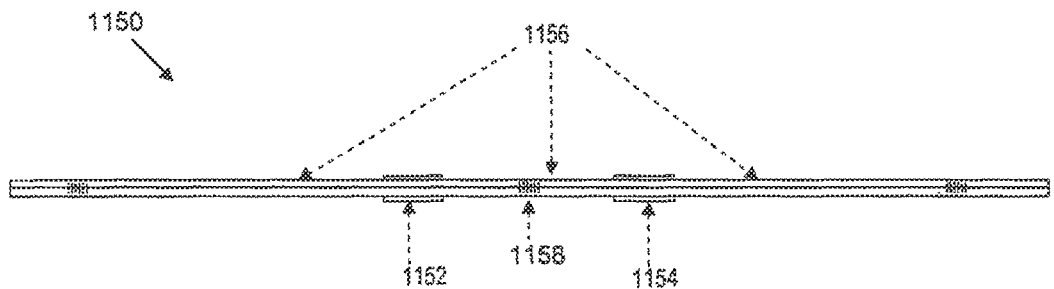
FIG. 11(b) shows a schematic diagram illustrating a tight-buffered FBG array according to an example embodiment.
Figure 11C:
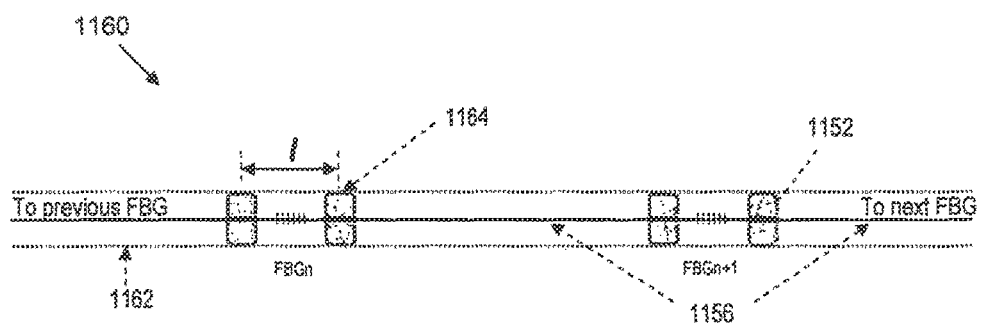
FIG. 11(c) shows a schematic diagram illustrating the structure of a tight-buffered FBG sensor array cable according to an example embodiment.

The single sensing element described above can be cascaded to form a FBG sensor array 1100, as shown in FIG. 11(*a*). For illustration purposes, the sensor array 1100 includes two adjacent FBGs 1102, 1104. It will be appreciated by a person skilled in the art that any number of FBGs may be included in a sensor array. Splicing points are protected using fiber splice protection sleeves 1106, 1108. Dummy splice protection sleeves 1112, 1114 can be fixed to the inner side of the resilient helical metal tube with epoxy (not shown). The distance between two adjacent FBGs, which determines the spatial resolution of the FBG sensor array 1100, can be varied. The tight buffer fiber 1150 can be inserted into a PVC jacket (approximately 3 mm) until it reaches the start of the sleeve structure/resilient metallic cable. The PVC jacket may contain a high strength material such as kevlar. Subsequently, some epoxy is applied to fix the 3 mm PVC jacket and the inner part of the resilient helical metal tube. Thereafter, a connector boot can be used to firmly join the resilient metallic cable and the 3 mm PVC jacket. This is to advantageously prevent stretching of the tight buffer fiber that is spliced to the first FBG sensor in the FBG sensor array.

In an alternate embodiment, the FBGs may be written on to a bare fiber at intervals that have been pre-determined. Thereafter, the entire length of the fiber is tight-buffered (i.e. the buffering may be of any diameter). The resulting tight-buffered fiber forms an FBG array, but without any splicing points. During the process of tight buffering, care is taken to mark the FBG area. The array can then be used to fabricate the sensor.

FIG. 11(*b*) shows a schematic diagram illustrating a tight-buffered FBG array 1150 according to an example embodiment. Here, two splice protection sleeves (SPS) 1152, 1154 are used as the dummies to anchor the fiber 1156 inside the armoured cable. The fiber 1156, containing the array 1150, is pushed through the protection sleeves 1152, 1154. One of the splice protection sleeves 1152 is placed 25 cm on one side of the FBG 1158, and the other sleeve 1154 is placed 25 cm on the other side. Then, the protection sleeve 1152, 1154, with the tight-buffered fiber 1156 inside, is kept in the heater of the splicing machine and the heater is switched on. The SPS 1152 may shrink and get fixed on to the tight-buffered fiber 1156. Similarly, the other SPS 1154 may also undergo the same steps. Now there are two protection sleeves 1152, 1154 disposed 25 cm on either side of the FBG 1158.

The tight-buffered FBG array 1150 (FIG. 11(*b*)), along with the dummy protection sleeves 1152, 1154 may then be made into the sensor cable as described above in the fabrication section. FIG. 11(*c*) shows a schematic diagram illustrating the structure of a tight-buffered FBG sensor array cable 1160 according to an example embodiment. In FIG. 11(*c*), the resilient metallic cable 1162 and the epoxy 1164 are similar to those described above.

It will be appreciated by a person skilled in the art that the dimensions provided above (e.g. 180-meter guiding wire, distance between sensors, wavelength, etc) are merely for illustrative purposes. The dimensions may be varied to suit specific applications.

The distance between adjacent FBGs (i.e. $FBG_n$ and $FBG_{n+1}$) can be varied and the distance determines the spatial resolution of the FBG sensor array. In other words, a single sensor can be customized to a certain effective sensor length (i.e., the spatial resolution and sensitivity can be pre-determined). Furthermore, it is relatively easy to cascade a series of FBG sensors to form a sensor array for monitoring and detection of intrusion events over a long stretch of fence line. Moreover, in the event one of the FBG sensors fails, only that particular sensor needs to be replaced.

In embodiments of the present invention, the hollow resilient helical metallic cable packaging provides improved sensitivity, crush resistance, and protection against rodents. The FBG sensors provide relatively high sensitivity, fast response time and high detection efficiency, at a relatively low cost.

Figure 12A:
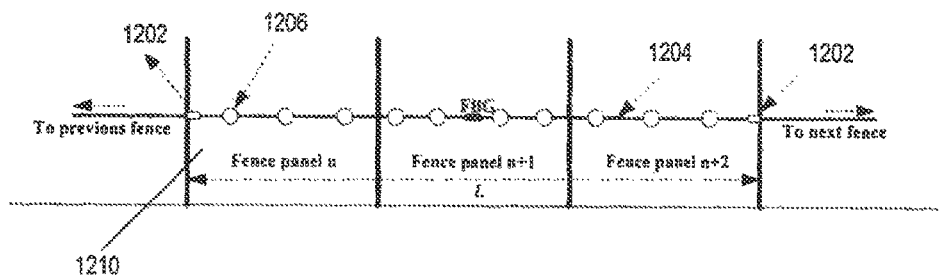
FIG. 12(a) is a schematic of an FBG sensor array that is installed on a structural feature, in accordance with embodiments of the present invention.

FIG. 12*a* is a schematic of an FBG sensor array that is installed on a structural feature, in accordance with embodiments of the present invention. In accordance with embodiments of the present invention, a method of installing the FBG sensor array on a structural feature, such as a fence, will now be described. The method may include the following steps:

1. One end of the sensor is tightly fixed onto the fence grid 1210 with a fixed mounting element, such as a metal plate 1202. The FBG sensor array 1204 is connected to an interrogator (not shown) and the wavelength of the FBG being installed is recorded.

2. The other end of the sensor 1204 is gently pulled until a pre-tension of 2.5 nm 3 nm is achieved. While maintaining this pre-tension, the other end of the sensor 1204 is tightly fixed to the fence grid 1210 using another metal plate 1202.

3. Securing means such as cable ties 1206 can be used at regular intervals (e.g. every 20 cm), along the length L of the sensor array 1204, to secure the sensor array 1204 loosely onto the fence grid 1210 to form free-play points (see FIG. 12*a*). Securing the FBG sensor array 1204 in this manner advantageously supports the sagging of FBG sensor array 1204 due to gravity and also allows the propagation of any vibration signal experienced by the fence 1210.

Figure 12B:
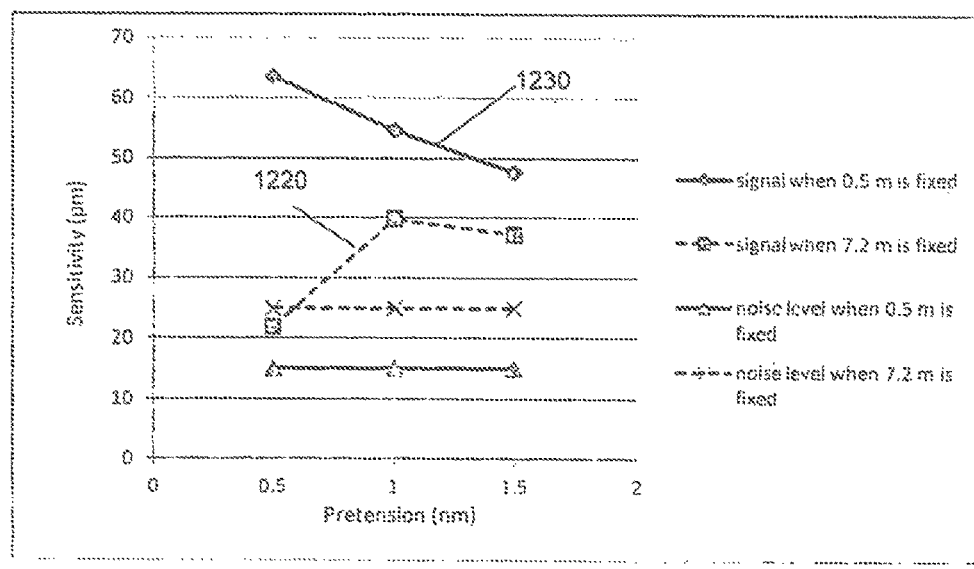
FIG. 12(b) shows graphs illustrating the variation of sensitivity under different pretension conditions.

It has been noted that, using the above deployment method, there may be a number of breakages at the FBG sensor point and/or at the splicing point (between FBG sensor element and the tight-buffered fiber). Thus, in the present embodiments, a lower pre-tension of about 1 nm is used. FIG. 12(*b*) shows graphs illustrating the variation of sensitivity under different pretension conditions. As can be seen in FIG. 12(*b*), the sensitivity is higher with a pretension of 1 nm. For example, line 1220 shows the variation of sensitivity when the cable is fixed at 3.2 m on either side of the FBG. Line 1230 shows the variation of sensitivity when the cable is fixed at 25 cm on either side of the FBG.

Figure 13:
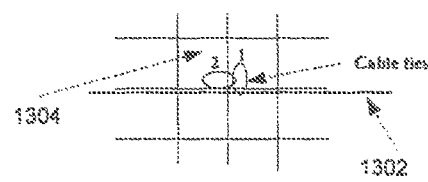
FIG. 13 is a schematic of an FBG sensor array that is installed on a structural feature, according to an embodiment of the present invention.

FIG. 13 shows a "dual cable tie" securing approach, according to an example embodiment of the present invention, in which a first cable tie 1 engages the FBG sensor array 1302 while a second cable tie 2 is used to secure cable tie 1 onto the fence grid 1304. In this example embodiment, the intrusion induced vibration signals can be effectively transferred to the FBG sensor via any of the two coupling points which determines the effective lengths of the FBG sensor.

Figure 14:
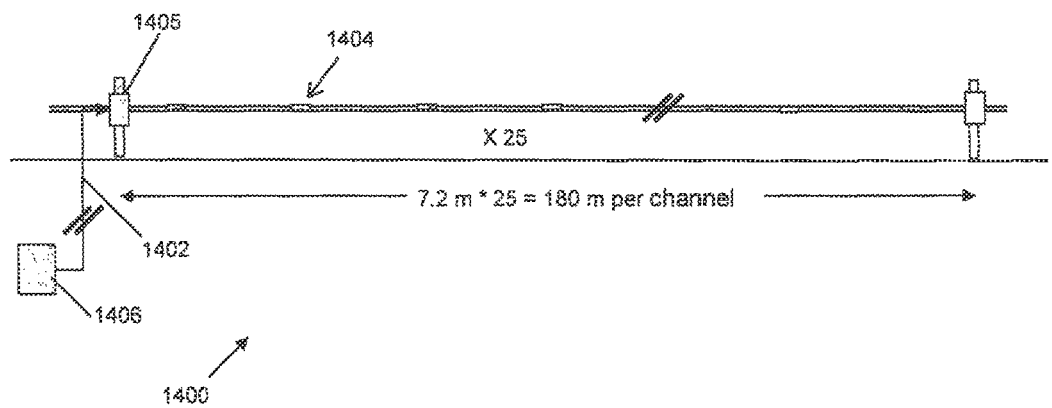
FIG. 14 is a schematic of an FBG sensor system, according to an embodiment of the present invention.

FIG. 14 is a schematic of an FBG sensor system 1400 according to an embodiment of the present invention. A fiber pigtail 1402 may be spliced and joined to one end of an FBG sensor array 1404 at a junction box 1405, and connected to an FBG interrogator and signal processing unit 1406 (e.g., a PC with the necessary software) to form the complete sensor system 1400.

One monitoring channel on the FBG interrogator (e.g. Micron Optics Inc, sm130) can sample up to twenty-five FBG sensors. Twenty-five FBGs with different wavelengths are cascaded and packaged in a hollow resilient helical metallic cable to form an FBG sensor array (~180 m long, assuming each FBG sensor is 7.2 meter long; e.g. sensor array 1404 above), and are monitored on one channel on the FBG interrogator.

Figure 15:
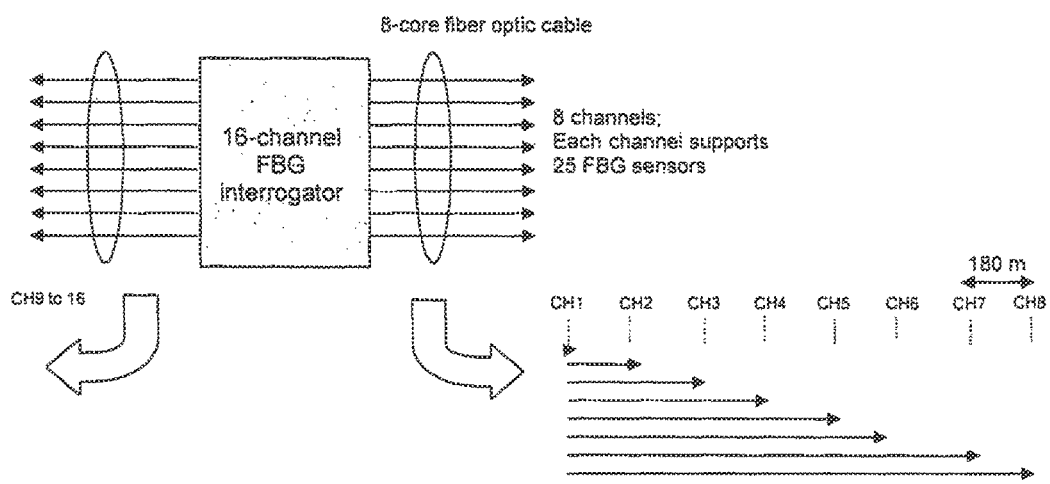
FIG. 15 is a schematic of a possible optimized deployment configuration of the PID sensor system, according to an embodiment of the present invention.

FIG. 15 is a schematic of a possible optimized deployment configuration of the PID sensor system, according to an embodiment of the present invention. With reference to FIG. 15, each 8-core fiber optic cable on the FBG interrogator can support 8 channels, thus, 200 FBG sensors can be monitored. Each FBG interrogator can have 16 channels, thus, one FBG interrogator (e.g. Micron Optics Inc/sm230-800 (this model supports 16 channels)) can support 400 FBG sensors covering 2.88 Km of fence line.

Figure 16A:
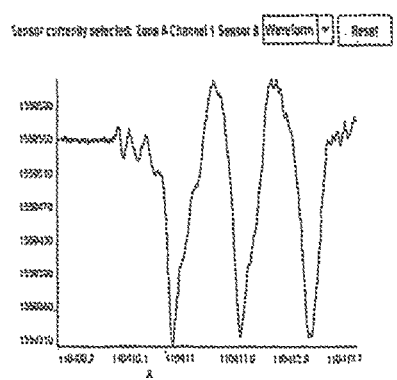
Figure 16B:
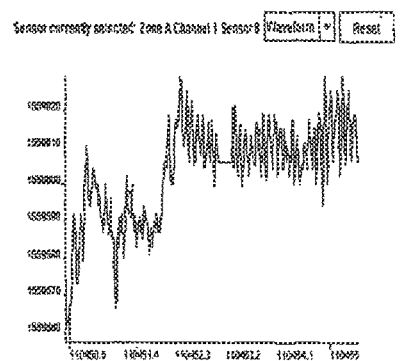

For field testing of the FBG sensor array according to embodiments of the present invention, 10 sets of FBG sensors were coupled to form an FBG sensor array in a perimeter fence environment. The total length was 72 meters, i.e. each sensor was 7.2 meters, which covered 3 fence panels. The effective length l is 50 cm. FIG. 16(a) shows the waveform obtained when an intruder climbs a fence. FIG. 16(b) shows the waveform obtained when an intruder places a ladder on a fence. FIG. 16(c) shows the waveform obtained when an intruder places a ladder on the struts of a fence. FIG. 16(d) shows the waveform obtained when an intruder climbs the struts of a fence. Based on the unique waveform obtained for each intrusion event, embodiments of the present invention can detect and determine the occurrence of an intrusion event.

FIG. 17 is a flow chart, designated generally as reference numeral 1700, illustrating a method of fabricating a FBG sensor structure, according to an example embodiment of the present invention. At step 1702, an optical fiber portion having at least one FBG formed therein is provided. At step 1704, the optical fiber portion is coupled to a sleeve structure. The sleeve structure is capable of transferring vibrations and/or strain along a length thereof, such that the wavelength of the optical fiber portion is variable under the transferred vibrations and/or strain.

Embodiments of the present invention are able to sense both vibration and intrusion-induced strain, which includes intrusion events such as climbing on a ladder that is placed against the pole, or sensor-cable tampering that does not cause any vibration to the fence.

Embodiments of the present invention advantageously provide a relatively high level of perimeter intrusion detection accuracy, which includes aided or unaided climbs, fence cuts and lifting, tampering (with the ability to pin-point the tampering location); and is capable of resolving nuisance events such as rain, birds sitting on the fence or seismic vibrations caused by aircraft landing or taking off. This may mean that a relatively smaller number of CCTVs are required as compared to other types of PIDS.

It will be appreciated by a person skilled in the art that numerous variations and/or modifications may be made to the present invention as shown in the embodiments without departing from a spirit or scope of the invention as broadly described. The embodiments are, therefore, to be considered in all respects to be illustrative and not restrictive.

What is claimed is:

1. A fiber Bragg grating (FBG) sensor structure comprising:
   a plurality of optical fiber portions, each one of the plurality of optical fiber portions having at least one FBG formed therein and a loose tube, wherein the at least one FBG is disposed within the loose tube, and wherein the loose tube is spaced approximately 2 cm apart from each of one or two neighboring loose tubes; and
   a sleeve structure capable of transferring vibrations, strain, or the vibrations and strain along a length thereof, wherein each of the plurality of optical fiber portions is coupled to the sleeve structure such that the wavelength of the each of the plurality of optical fiber portions is variable under the transferred vibrations, strain, or the vibrations and strain, and
   wherein the plurality of optical fiber portions are split from one another by one or more single mode fibers.

2. The FBG sensor structure as claimed in claim 1, wherein each of the plurality of optical fiber portions comprises two spaced collars, and wherein the two spaced collars are connected to an inner circumference of the sleeve structure and each of the two spaced collars affixes the loose tube to each of the one or two neighboring loose tubes.

3. The FBG sensor structure as claimed in claim 2, wherein each of the plurality of optical fiber portions comprises a bare fiber within which the at least one FBG is formed, the bare fiber disposed within the loose tube, and wherein each of the two spaced collars grips the bare fiber.

4. The FBG sensor structure as claimed in claim 3, wherein each of the two spaced collars is used as an epoxy anchor point to anchor the each of the two spaced collars to the inner circumference of the sleeve structure, and wherein splicing points are formed on the bare fiber to splice the bare fiber to the one or more single mode fibers at locations in each of the one or two neighboring loose tubes away from the epoxy anchor point to reduce strain on the splicing points.

5. A fiber Bragg grating (FBG) sensor structure comprising:
   a plurality of optical fiber portions, the plurality of optical fiber portions being split from one another by one or more single mode fibers and each one of the plurality of optical fiber portions comprising a bare fiber and a loose tube, the bare fiber having at least one FBG formed therein and the bare fiber and the at least one FBG disposed within the loose tube; and
   a sleeve structure capable of transferring vibrations, strain, or the vibrations and strain along a length thereof, wherein each of the plurality of optical fiber portions is coupled to the sleeve structure such that the wavelength of the each of the plurality of optical fiber portions is variable under the transferred vibrations, strain, or the vibrations and strain,
   wherein each of the plurality of optical fiber portions further comprises two spaced collars, and wherein the two spaced collars are connected to an inner circumference of the sleeve structure and wherein each of the two spaced collars affixes the loose tube to each of one or two neighboring loose tubes, and wherein each of the two spaced collars grips the bare fiber.

6. The FBG sensor structure as claimed in claim 5, wherein the loose tube is spaced approximately 2 cm apart from each of the one or two neighboring loose tubes.

7. The FBG sensor structure as claimed in claim 5, wherein each of the two spaced collars is used as an epoxy anchor point to anchor the each of the two spaced collars to the inner circumference of the sleeve structure, and wherein splicing points are formed on the bare fiber to splice the bare fiber to the one or more single mode fibers at locations in each of the one or two neighboring loose tubes away from the epoxy anchor point to reduce strain on the splicing points.

* * * * *